(12) United States Patent
Kaise

(10) Patent No.: US 8,488,214 B2
(45) Date of Patent: Jul. 16, 2013

(54) IMAGE READING APPARATUS AND OPTICAL MODULE USING THE SAME

(75) Inventor: Kikuo Kaise, Kanagawa (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 13/064,008

(22) Filed: Mar. 2, 2011

(65) Prior Publication Data
US 2011/0249304 A1    Oct. 13, 2011

(30) Foreign Application Priority Data

Apr. 7, 2010 (JP) .................................. 2010-088535

(51) Int. Cl.
*H04N 1/04* (2006.01)

(52) U.S. Cl.
USPC ........... 358/474; 358/497; 358/483; 359/622; 359/626

(58) Field of Classification Search
USPC .. 358/474, 497, 496, 501, 505, 483; 359/621, 359/622, 626, 456, 455, 619
See application file for complete search history.

(56) References Cited

U.S. PATENT DOCUMENTS

| | | | |
|---|---|---|---|
| 6,239,421 B1 | 5/2001 | Nagata et al. | |
| 6,646,807 B2 * | 11/2003 | Yoshikawa et al. | 359/619 |
| 6,657,749 B1 * | 12/2003 | Beeson | 358/471 |
| 6,693,748 B1 | 2/2004 | Fujimoto et al. | |
| 6,839,157 B2 * | 1/2005 | Ono et al. | 359/204.1 |
| 7,956,885 B2 * | 6/2011 | Nomura et al. | 347/244 |
| 7,995,085 B2 * | 8/2011 | Nomura | 347/238 |
| 8,009,361 B2 * | 8/2011 | Nomura et al. | 359/619 |
| 8,049,937 B2 * | 11/2011 | Saito | 358/474 |
| 8,077,190 B2 * | 12/2011 | Inoue et al. | 347/130 |
| 8,243,346 B2 * | 8/2012 | Suzuki | 358/474 |
| 8,274,741 B2 * | 9/2012 | Koizumi et al. | 359/619 |
| 2010/0202800 A1 * | 8/2010 | Sowa et al. | 399/218 |
| 2011/0007368 A1 * | 1/2011 | Saito | 358/475 |
| 2011/0018336 A1 * | 1/2011 | Mercat et al. | 301/95.106 |
| 2011/0128594 A1 * | 6/2011 | Sowa et al. | 358/475 |

FOREIGN PATENT DOCUMENTS

| | | |
|---|---|---|
| JP | 3507284 | 12/2003 |
| JP | 3910754 | 2/2007 |
| JP | 3910758 | 2/2007 |

* cited by examiner

*Primary Examiner* — Negussie Worku
(74) *Attorney, Agent, or Firm* — Rader, Fishman & Grauer PLLC

(57) ABSTRACT

An image reading apparatus includes: a light irradiating means for irradiating light to a subject having images to be read; an image forming means for making the light from the subject incident on an image plane so as to form images as erected images; and a photoelectric conversion means for converting the incident light of the erected images into image signals, wherein the image forming means is constituted of a plurality of lens arrays that have a mutually identical shape and property and are sequentially disposed, sharing common light axes, between the subject and the photoelectric conversion means, and the respective lens arrays are formed by integral molding of a plurality of lenses, and an aperture provided with light passing holes with the light axes as the center is interposed at least between the plurality of lens arrays, and areas other than the light passing holes in the aperture form light shielding areas.

12 Claims, 16 Drawing Sheets

<OCCURRENCE OF OVERLAPPING IN CASE OF NO APERTURE>

WITHOUT AN APERTURE AP FORMED, IMAGES OF ADJACENT PIXELS ARE OVERLAPPED, AND, IF AN OBJECT DEVIATES FROM THE FOCAL PLANE, BLURRED IMAGES ARE OVERLAPPED AND MTF REMARKABLY DEGRADES.

AN APERTURE IS INSERTED BETWEEN LENS ARRAYS
SO AS TO PREVENT OVERLAPPING.

<PREVENTION OF CROSS TALK BY ADDITION OF APERTURE (1)>

ANOTHER APERTURE IS INSTALLED IN THE LIGHT
REFLECTION SIDE SO AS TO PREVENT CROSS TALK.

FIG.10
<MEASUREMENT RESULT OF MTF>
VARIATION IN MTF@6 lp/mm WITH GAP AMOUNT Z OF OBJECT PLANE

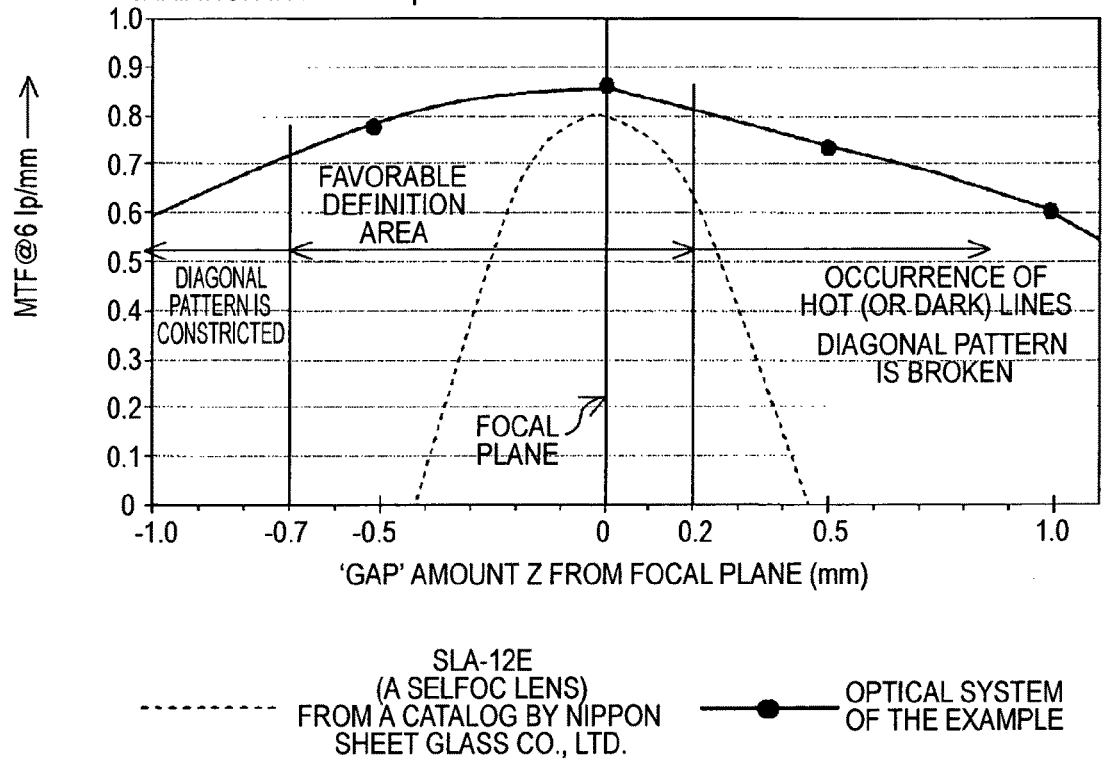

- - - - - - SLA-12E (A SELFOC LENS) FROM A CATALOG BY NIPPON SHEET GLASS CO., LTD.
—●— OPTICAL SYSTEM OF THE EXAMPLE

IF THE DIAMETER OF THE INTERMEDIATE APERTURE IS OPTIMIZED AND AN IMAGE READING APPARATUS IS INSTALLED SO THAT AN OBJECT SURFACE IS POSITIONED BELOW THE FOCAL PLANE, IN THE EXAMPLE, IT IS POSSIBLE TO OBTAIN FAVORABLE IMAGES IN A RANGE FROM 0.2 mm ABOVE THE FOCAL PLANE TO 0.7 mm BELOW THE FOCAL PLANE.

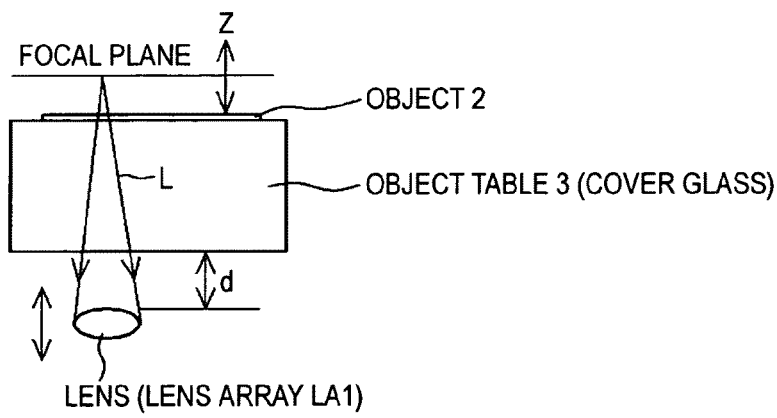

THE DISTANCE Z FROM THE FOCAL (DISTANCE) PLANE TO THE OBJECT PLANE (INSTALLED ON THE COVER GLASS) IS VARIED BY VARYING THE DISTANCE d BETWEEN THE LENS ARRAY LA1 AND THE COVER GLASS 3.

FIG.11

<HOT LINE SIMULATION EXAMPLE>

EXAMPLE OF RAY TRACING SIMULATION IN A CASE IN WHICH THE OPENING DIAMETER OF THE INTERMEDIATE APERTURE IS 0.55 mmΦ (LARGER THAN THE DESIGN VALUE 0.49 mmΦ) AND AN OBJECT IS POSITIONED ON THE FOCAL PLANE.

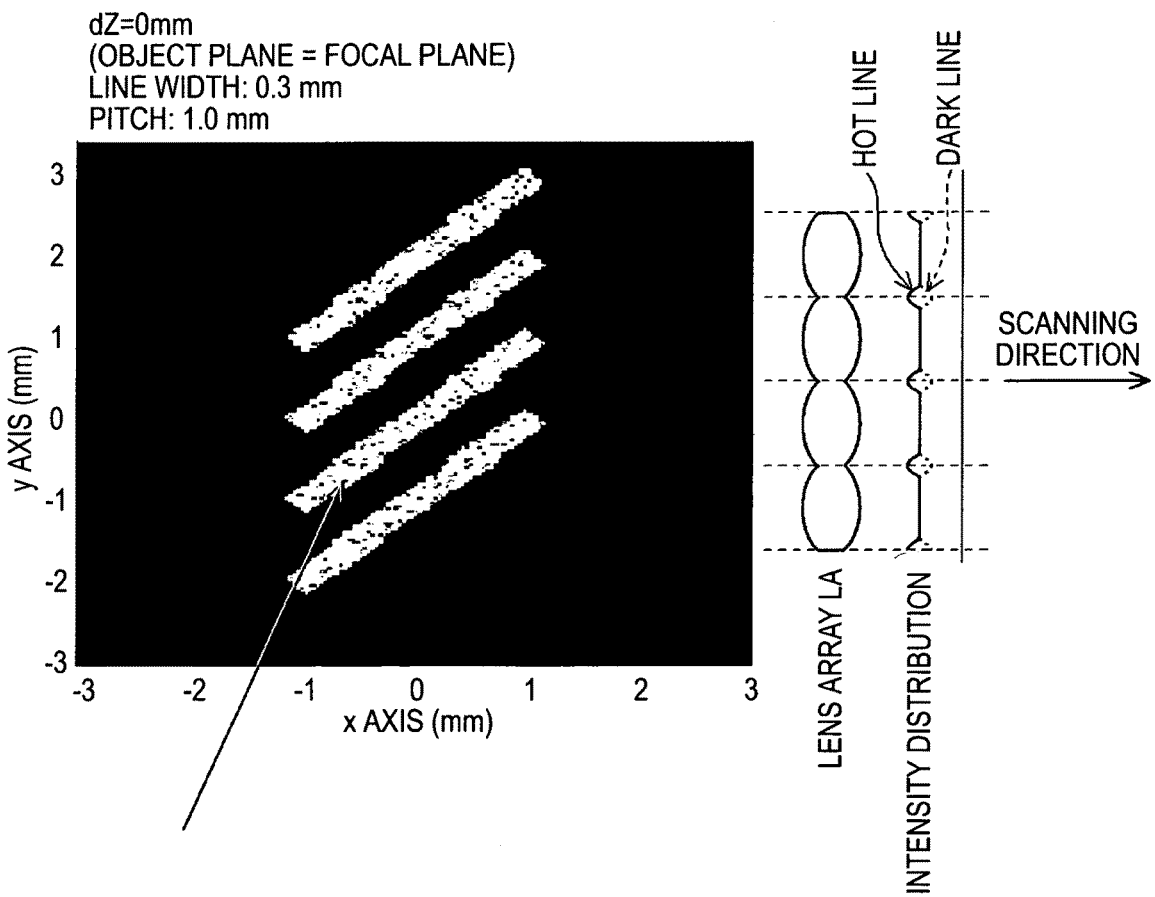

HOT LINES ARE GENERATED AT BOUNDARIES BETWEEN LENSES.
THE COLLECTED LIGHT FROM EACH LENS IS OVERLAPPED ON THE BOUNDARIES, AND THUS BRIGHT PORTIONS (HOT LINES) ARE GENERATED IN A LINEAR SHAPE ON THE BOUNDARIES.
IF THE DIAMETER OF THE APERTURE IS SMALL (ABOUT Φ 0.45 mm), DARK LINES ARE GENERATED.

<HOT LINE COUNTERMEASURE EXAMPLE (1)>
VARY ONLY THE OPENING DIAMETER OF THE INTERMEDIATE APERTURE
TO 0.49 mmΦ (DESIGN VALUE) SO AS TO VARY THE MIXING STATE OF
LIGHT (NO CHANGE IN MTF).

dZ=0mm
(OBJECT PLANE = FOCAL PLANE)
LINE WIDTH: 0.3 mm
PITCH: 1.0 mm
BLACK LEVEL BRIGHTNESS 0%
WHITE LEVEL BRIGHTNESS 100%

SCANNING DIRECTION →

IT IS POSSIBLE TO REMOVE HOT (OR DARK) LINES.

FIG.13
<HOT LINE COUNTERMEASURE EXAMPLE (2)>
BRIGHTNESS IN LENS ARRAY DIRECTION WITH
BLACK LEVEL BRIGHTNESS VARIED TO 25%
dZ=0mm
(OBJECT PLANE = FOCAL PLANE)
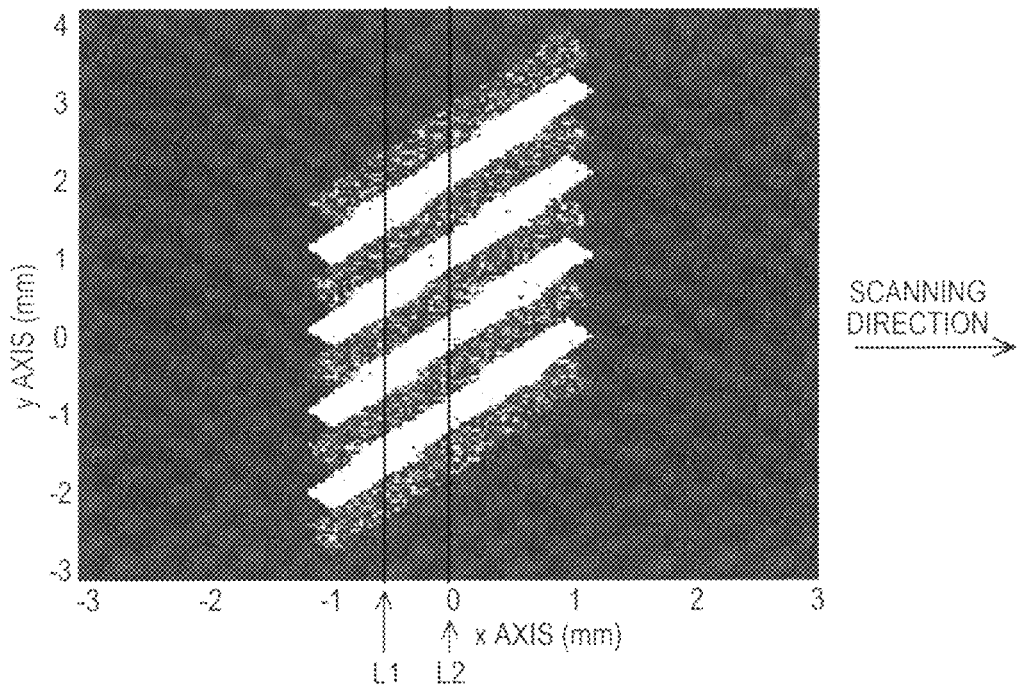
BRIGHTNESS VARIATION ALONG THE LINE L1 (ABOVE THE LENS EDGE) AND THE
LINE L2 (ABOVE THE LENS CENTER) IS SHOWN. ALTHOUGH STATISTICAL ERRORS
OCCUR IN RAY TRACING, LINEAR BRIGHTNESS VARIATION DISAPPEARS.
(VALID IN THE FOLLOWING)
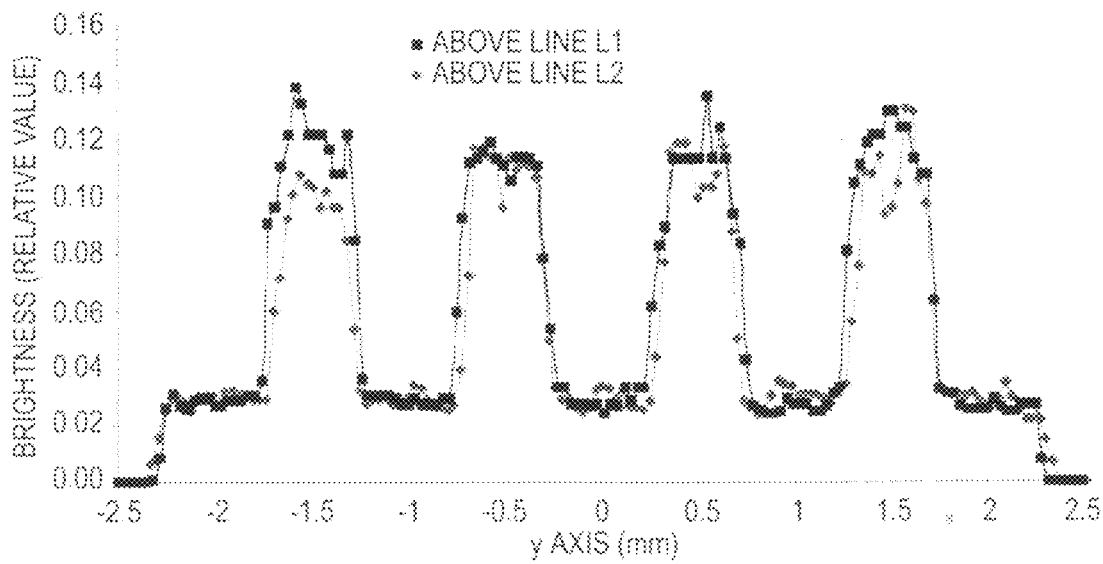

FIG.14
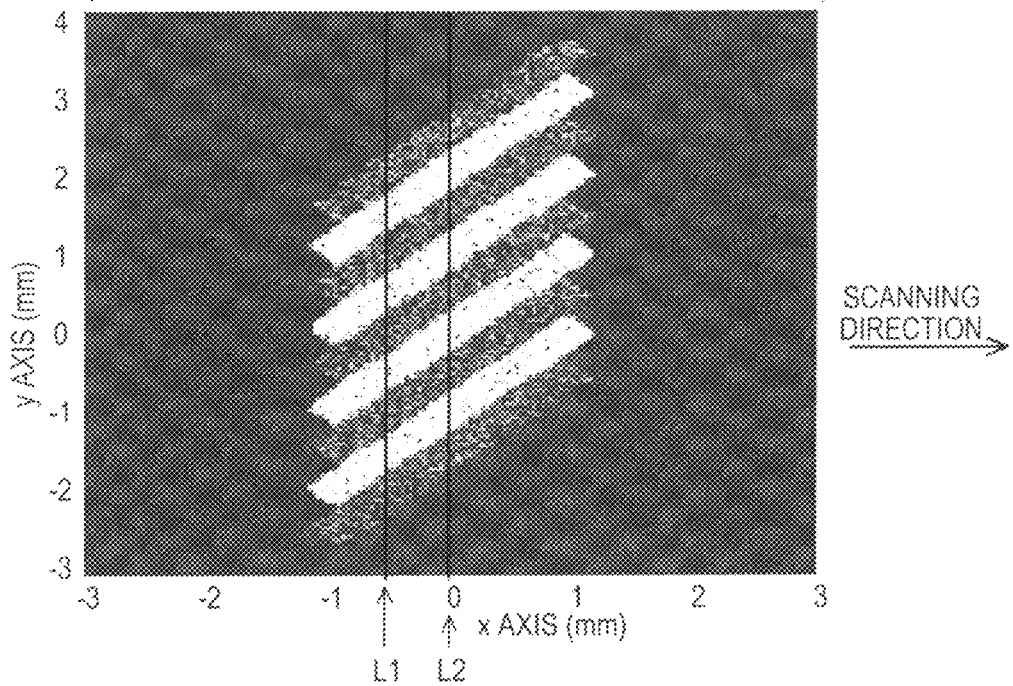
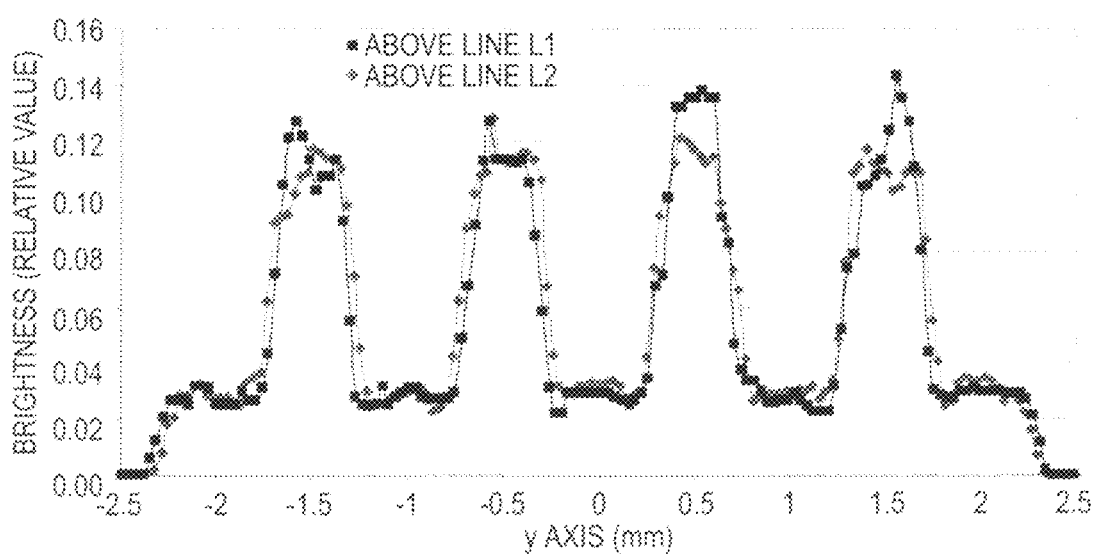

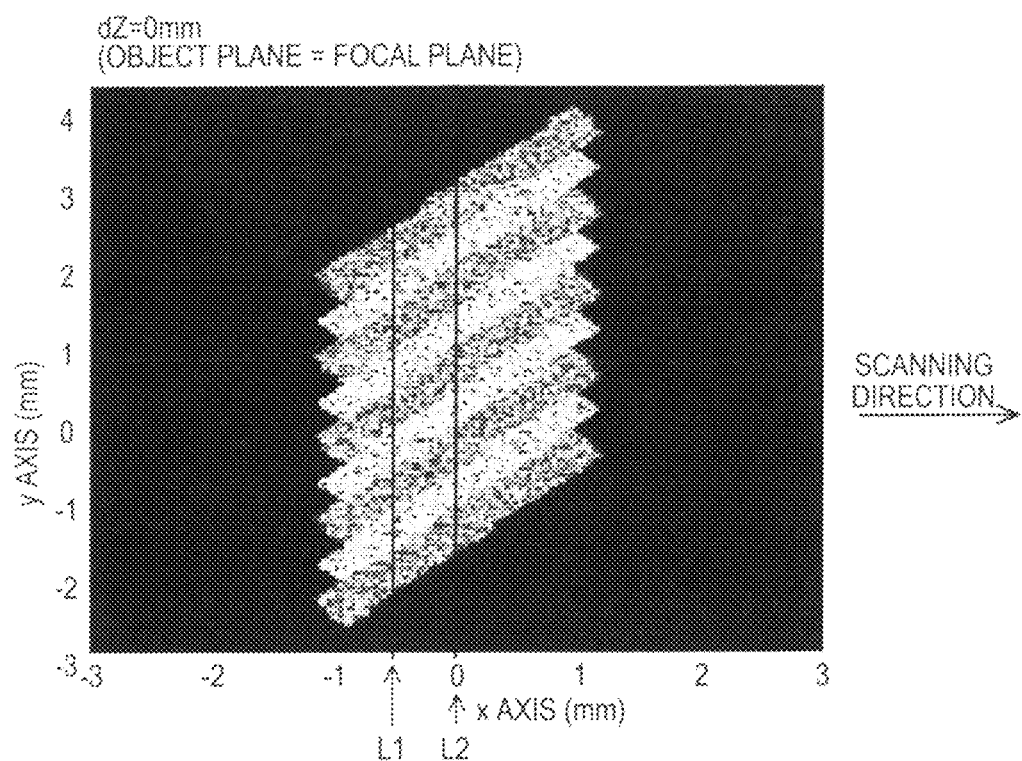
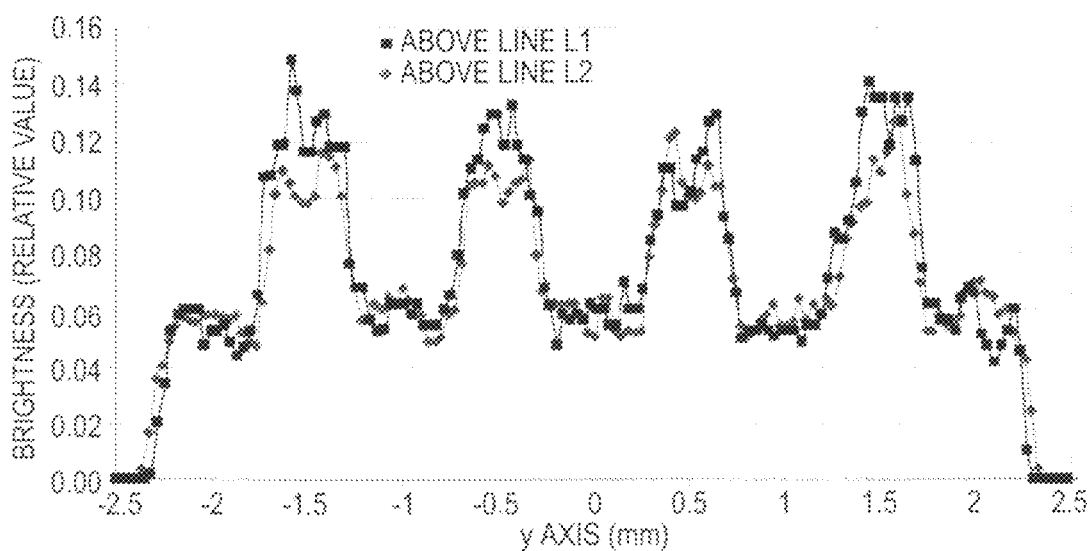

FIG.16
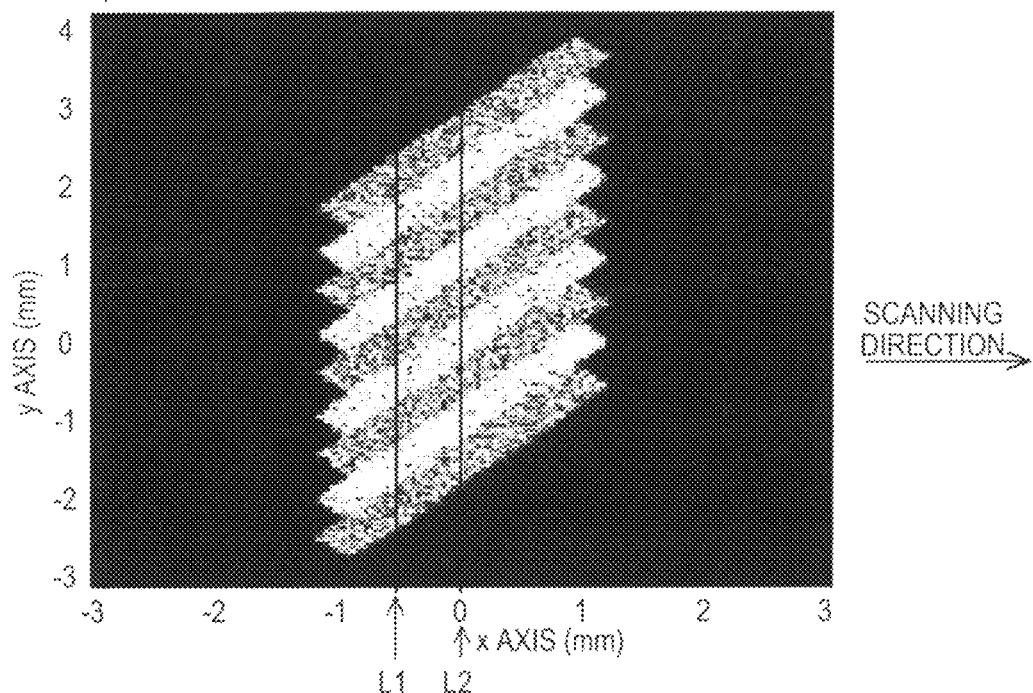
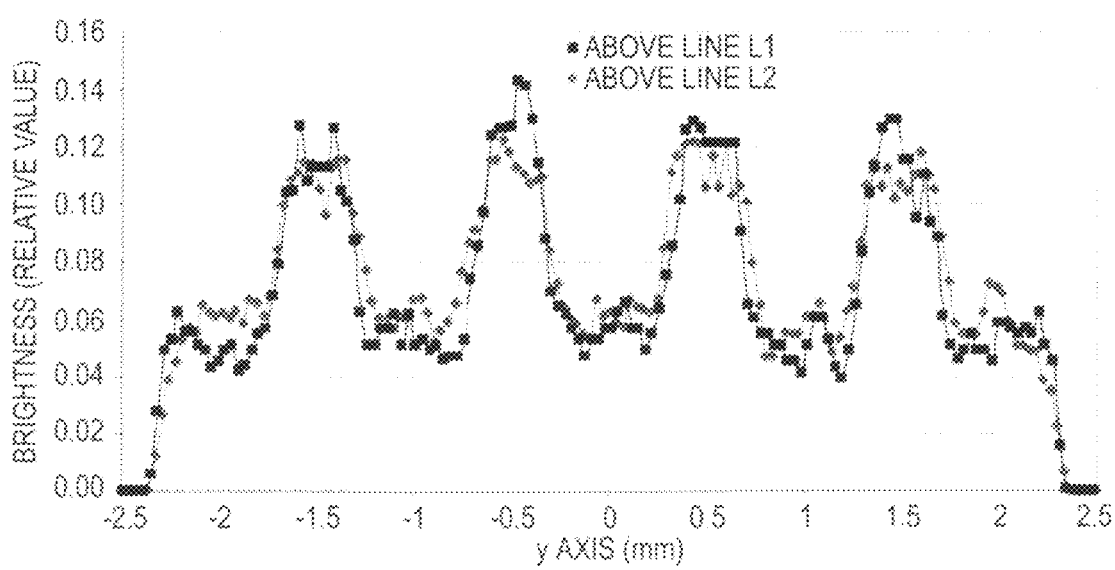

IMAGE READING APPARATUS AND OPTICAL MODULE USING THE SAME

BACKGROUND OF THE INVENTION

1. Field of the Invention

The present invention relates to an image reading apparatus, such as an image scanner or the like, having a light irradiating means for irradiating, for example, linear light to a subject, such as an object having images to be read, an image forming means, such as a linear lens array or the like, for making the light from the subject incident on an image plane so as to form images as erected images, and a photoelectric conversion means for converting the incident light of the erected images into image signals; and an optical module constituted by unitizing the light irradiating means, the image forming means and the photoelectric conversion means.

2. Description of the Related Art

In an image reading apparatus, such as a copy machine or a peripheral device and a multifunction machine using the same, an image scanner, a facsimile or the like, in the related art, copying, printing or the like has been performed by making a reading unit having a contact image sensor (CIS) module or the like scan an object placed and fixed on a cover glass surface (generally, a soda lime glass with a thickness of 2.9 mm), transmitting image information of letters, photos or the like on the object planes (reflected light from the object planes) at each scanning position to a rod lens array, making the rod lens array form erected images of unity magnification on a charge-coupled device (CCD) linear sensor, a complementary metal oxide semiconductor (CMOS) linear sensor or the like, and then synthesizing and processing image signals obtained from the sensor.

On the other hand, like an information processing apparatus shown in Japanese Patent No. 3507284 to be described below or the like, an apparatus is also used that automatically transports an object plane and reads letters, photos or the like on the object plane beyond the surface of the cover glass (with a thickness of about 1 mm). In addition, there is an apparatus provided with reading apparatuses at both sides to read the front and rear planes of an object so as to perform reading of both planes at the same time.

In any case, the light to be irradiated on an object plane is emitted from a plurality of LEDs (light emission diodes with emission colors of R, G, B or the like) positioned at the end surface of a light guide body, but is uniformly dispersed and diffused in the identical or perpendicular direction to the scanning direction of a scanner or the like by the light guide body made of plastic, such as an acrylic resin or the like, and is irradiated on an object plane. The irradiated light is reflected from the object plane, and the reflected light passes through the rod lens array or the like, and is guided to the CCD or CMOS sensor disposed in a linear format, and is read as image signals of the object. In this case, a widely used rod lens array is a SELFOC Lens, manufactured by Nippon Sheet Glass Co., Ltd.

SUMMARY OF THE INVENTION

Although a SELFOC lens performs a role of forming on a linear image sensor erected images of unity magnification of images (such as letters, drawings, photos or the like) on object planes and has a small size, light weight and excellent operability, a SELFOC lens has the following problems.

(1) In the manufacturing process, it is necessary to mold a glass material in a fine fiber shape and to form an index of refraction distribution in the moving radius (radius) direction.

(2) It is necessary to cut the fiber-shaped glass compacts into segments with the same length so as to produce individual rod lenses and to precisely line up the rod lenses in parallel with an array format so as to planarize the cut end surface, thereby preventing scattering or the like.

(3) It is necessary to cover the outer circumference of the glass in the respective rod lenses with a black resin or the like so that light incident on the respective rod lenses does not cause cross talk with adjacent rod lenses.

As such, since a SELFOC lens is supposed to go through a complicated and precise assembly process, the price is liable to rise and it is difficult to meet customers' demands, and, in addition, there are cases in which variation or the like in the manufacturing process causes variation in optical performances, particularly resolution or the like, for each lens array. In addition, the intrinsic resolution of the lens array often falls within a range of substantially from 300 dpi to 600 dpi, and thus fails to meet the intrinsic resolution of the CCD or CMOS linear image sensor (equal to or more than 1000 dpi, for example 1200 dpi), which causes disadvantages of the necessity of correction through signal processing or the like.

Furthermore, in a SELFOC lens, in a case in which an object plane is not placed flush on the cover glass surface, the modulation transfer function (MTF) abruptly deteriorates, which ultimately makes the depth of focus extremely short. As a result, a gap between an object plane and the cover glass surface is liable to cause blurred images, and therefore it is necessary to tightly place an object plane on the cover glass to maintain the resolution, which tends to make it difficult to employ an auto document feeder (ADF) or the like. In addition, it is necessary to accurately maintain and manage the distance between the cover glass and the SELFOC lens surface, which becomes a cause of degradation in operability in the manufacturing process of a scanner or the like.

However, despite the above disadvantages described, due to the convenience or the like, a SELFOC lens is used in almost all contact image sensor modules as an optical element for contact image sensors.

Japanese Patent No. 3910754 and Japanese Patent No. 3910758, both of which will be described below, show examples with replacement of the SELFOC lens with a plurality of lens arrays.

In the examples, the respective lens arrays may be molded by the injection molding method using a metal mold, but since a plurality of lens arrays are not identical objects (having an identical shape and an identical property or material), it is necessary to draw optical designs and produce the respective lens array individually. As a result, the lengths of the respective lenses vary, and the lens designs for the respective surfaces vary with the respective lens arrays.

Additionally, high accuracy is necessary when molding lens shapes and assembling lens arrays for all lenses, and it is presumed that high accuracy is also necessary for installation even in the mass production process of apparatuses using the same, but it is not simple to accurately mold all the individual lens shapes included in the respective lens array. Therefore, in a case in which the respective lenses use a plurality of different types of lens arrays, high accuracy is necessary for the respective lenses and the accuracy is supposed to be maintained, which makes the manufacturing thereof extremely difficult and extends the manufacturing time.

In addition, the respective lens array is formed with a light shielding material, which is considered preferable for prevention of cross talk by light, coated or implanted in the side surface or the like of the lens, and the formation of the light shielding material is also difficult and thus increases the costs.

As a result, it is presumed to be difficult in reality to manufacture the lens arrays at a cost less than or equal to the cost of a SELFOC lens.

Thus, it is desirable to provide an image reading apparatus capable of solving the above problems in the related art, enlarging the depth of focus of lens arrays, suppressing the degradation in the resolution due to a gap caused by a subject (object), and easily performing the design and manufacturing of lens arrays, including a cross talk prevention means, with high accuracy at a low cost, and an optical module using the same.

An embodiment of the invention relates to an image reading apparatus having a light irradiating means (for example, a light emission diode or a light guide body) for irradiating light to a subject (for example, an object) having images to be read, an image forming means (for example, lens arrays in a two or three-line format) for making the light from the subject incident on an image plane so as to form images as erected images, and a photoelectric conversion means (for example, a CCD or CMOS linear sensor) for converting the incident light of the erected images into image signals, in which the image forming means is constituted of a plurality of lens arrays that have a mutually identical shape and property and are sequentially disposed, sharing common light axes, between the subject and the photoelectric conversion means, and the respective lens arrays are formed by integral molding of a plurality of lenses, at least an aperture provided with light passing holes with the light axes as the center is interposed between the plurality of lens arrays, and areas other than the light passing holes in the aperture form light shielding areas; and an optical module constituted by unitizing the light irradiating means, the plurality of lens arrays, the aperture and the photoelectric conversion means.

According to the image reading apparatus and the optical module of the embodiment of the invention, since a plurality of lens arrays, as an image forming means for forming erected images, have an identical shape and an identical property and are formed by integral molding of a plurality of lenses, it is possible to mold the lens arrays using a common metal mold and to easily design and manufacture the respective lens arrays with high accuracy at a low cost.

In addition, since at least an aperture is interposed between the plurality of lens arrays and therefore it is possible to prevent overlapping of images between adjacent lenses, it is possible to suppress degradation in the resolution even when a gap caused by a subject occurs and, ultimately, to enlarge the depth of focus. In addition, since just the aperture is necessary to be inserted at least between the lens arrays, the structure becomes simple, which contributes to the simplification and cost reduction of the design and manufacturing of the apparatus.

BRIEF DESCRIPTION OF THE DRAWINGS

FIG. 10 is a graph showing the variation in MTF with the gap amount of an object from the focal plane in the same case.

FIG. 11 is a view of ray tracing simulation when the diameter of the intermediate aperture opening is large in a case in which an object is placed in the focal plane in the same case.

FIG. 13 is a set of a simulation view and a graph showing the variation in brightness in the lens array direction in the same case.

FIG. 14 is a set of a simulation view and a graph showing the variation in brightness in the lens array direction when an object is placed below the focal plane in the same case.

FIG. 15 is a set of a simulation view and a graph showing the variation in brightness in the lens array direction when an object is placed in the focal plane with an increased black level in the same case.

FIG. 16 is a set of a simulation view and a graph showing the variation in brightness in the lens array direction when an object is placed below the focal plane in the same case.

DESCRIPTION OF THE PREFERRED EMBODIMENTS

In an image reading apparatus and an optical module of an embodiment of the invention, it is necessary to dispose an aperture, among the middle position, the light incidence side and the light reflection side of a plurality of lens arrays, at least at the middle position to realize the above-described effects, and interposing apertures at the light reflection side and, furthermore, at the light incidence side enables suppression of cross talk by light between adjacent lenses and is advantageous for enlargement of the depth of focus.

In addition, since a subject is disposed at a position closer to an image forming unit than the focal plane of the image forming unit formed at a side of the subject, it is possible to obtain high-definition images with a high MTF even when the depth of focus is enlarged or to enlarge the depth of focus at which high definition may be obtained.

Furthermore, since a light irradiating unit, the image forming unit, a aperture and the photoelectric conversion unit are unitized, it is possible to have a configuration in which the light irradiating unit irradiates (scans) linear light to the subject while the unit moves along with respect to a subject, the linear light reflected from the subject passes through the light passing holes in the aperture, and the plurality of lens arrays form erected images of unity magnification on the image plane.

In this case, it is preferable that the light irradiating unit is constituted of a light emission element and a light guide body; the image forming unit is constituted of a plurality of lens arrays which is formed by integrally molding a plurality of spherical lenses in a line shape using the same metal mold; the aperture is constituted of a light shielding film provided with a plurality of round light passing holes sharing the same centers with the plurality of round lenses; and, furthermore, the photoelectric conversion unit is constituted of a linear image sensor.

Hereinafter, preferable embodiments of the invention will be described in detail with reference to the accompanying drawings.

Figure 1:
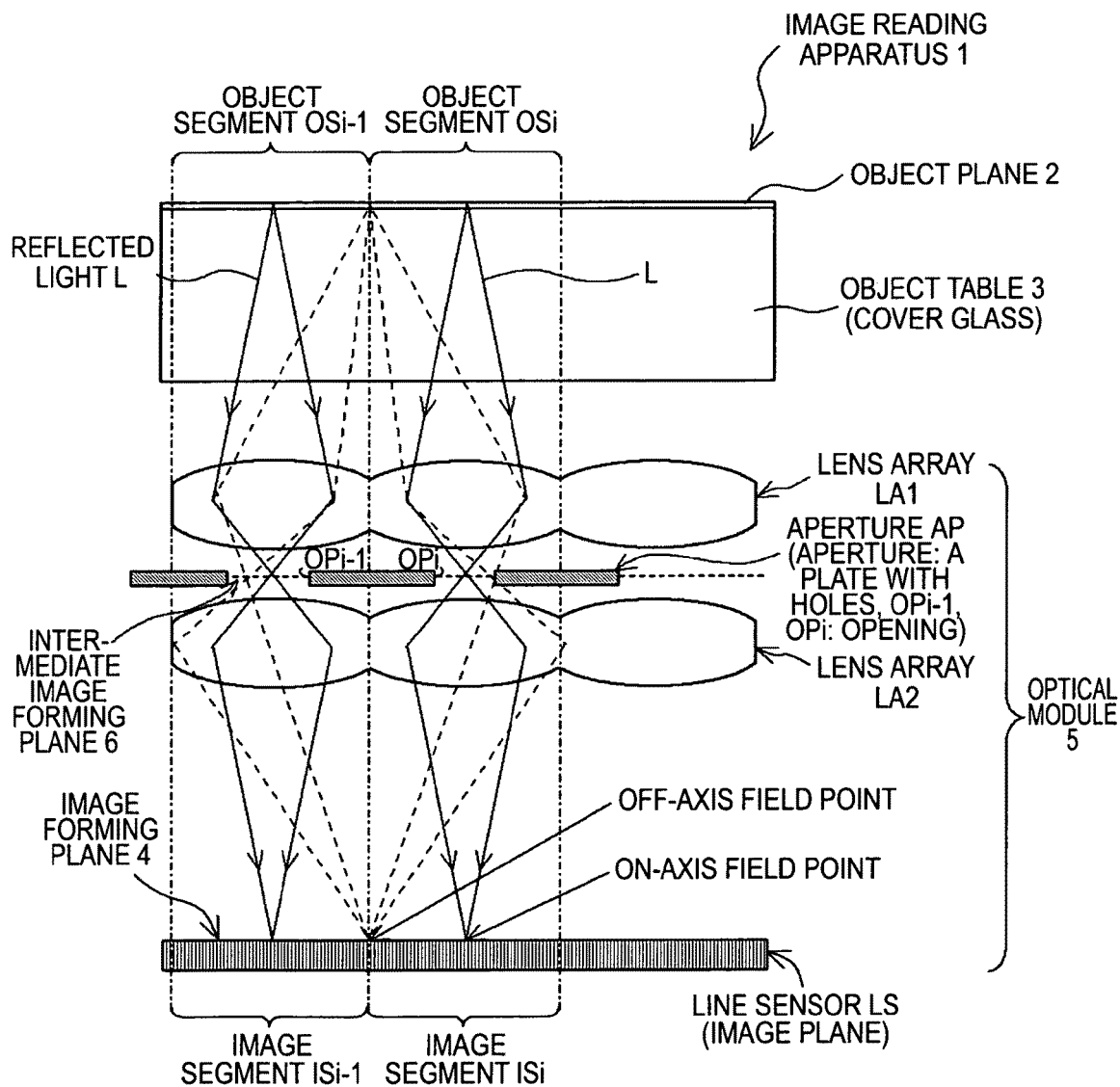
FIG. 1 is a view showing the principle of image reading in a schematic cross-sectional view of the main parts of the image reading apparatus according to an embodiment of the invention.

FIG. 1 schematically shows the main parts of an image reading apparatus according to the embodiment and the principle of image reading.

The image reading apparatus 1 has an object table 3 on which objects 2 including images to be read are placed and an optical module (a contact image sensor module) 5 constituted of a unit including a light emission element and a light guide body (not shown) that irradiates linear light to the object (plane) 2, for example, two lens arrays LA1 and LA2 that make the reflected light L from each segment (pixel) OS on the object (plane) 2 incident on each image segment IS on the image (image forming) plane 4 of a line sensor LS and form erected images of unity magnification, and a linear image sensor (line sensor) LS that converts the incident light of the erected images into image signals and is constituted of a CCD or CMOS. Meanwhile, for easier understanding, the drawings show a lens array with several lenses, but, in reality, a lens array has 100 lenses (valid in the following description).

Additionally, attention should be paid to the fact that the lens arrays LA1 and LA2 are sequentially disposed, sharing common light axes, between the object 2 and the line sensor LS and have a mutually identical shape and an identical property; the respective lens arrays are formed by integral molding of a plurality of lenses; between the lens arrays LA1 and LA2, an aperture AP provided with round openings (light passing holes) OP with the light axes as the center is interposed at an intermediate image forming plane 6; and areas other than the openings OP in the aperture form light shielding areas.

Figure 2:
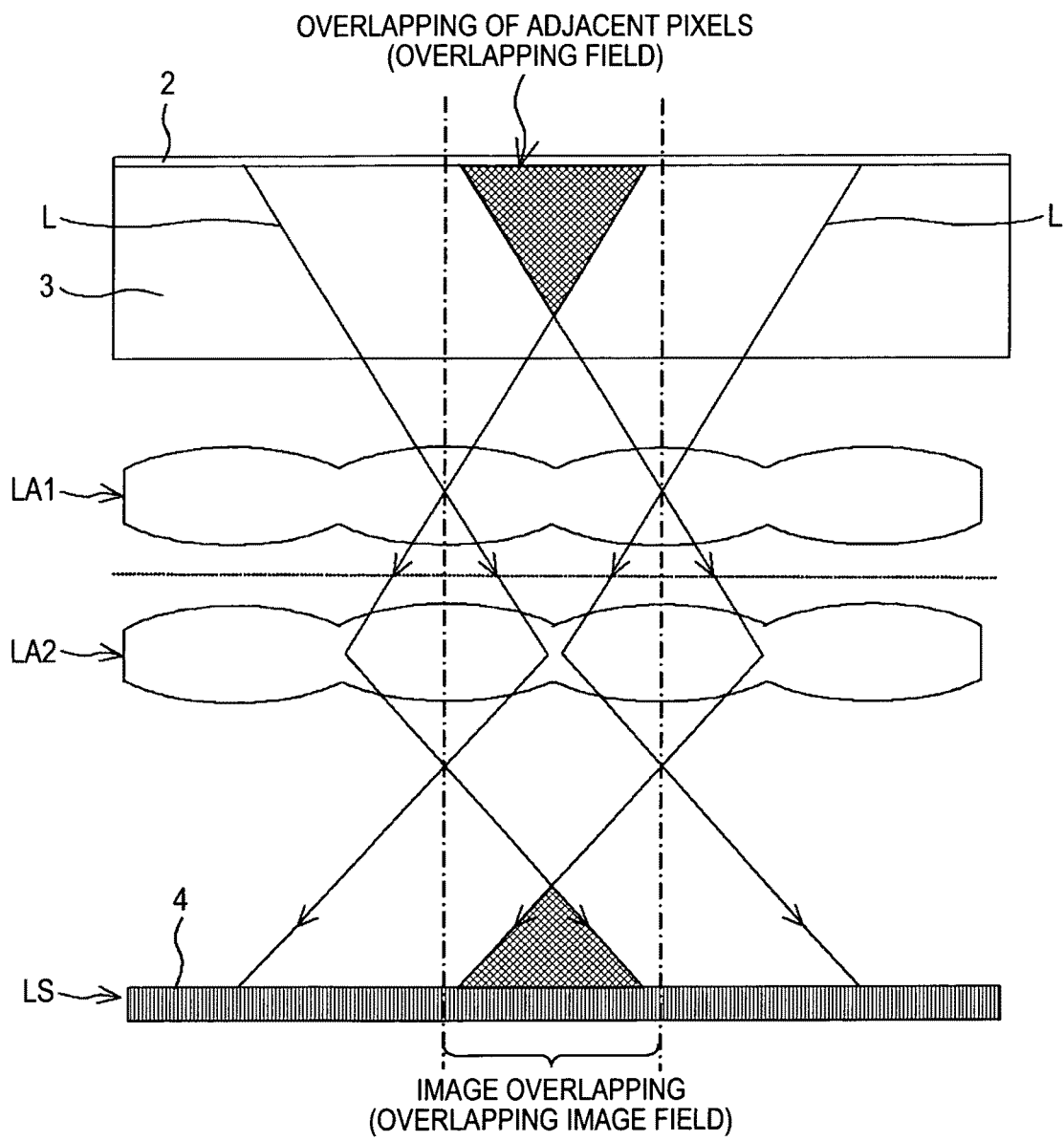
FIG. 2 is a view explaining the principle of the occurrence of overlapped images in a case in which an aperture is not provided.

Like a scanner, in a case in which A4 or A3 size object planes are scanned not in a reduced optical system, but in an optical system, it is necessary to use a lens array or the like. In this case, each lens in the above-described lens arrays LA1 and LA2 is assigned to each divided portion of image areas on the object plane 2 and projects the image of the assigned divided portion (segment or pixel OS) on the sensor LS. If each lens in the lens array forms an image of the assigned divided portion OS (object segment) in a one to one relationship, in principle, it is possible to cover all areas, but, depending on light rays, as shown in FIG. 2, it becomes important to deal with overlapped areas of the assigned portions of adjacent lenses, and, in a case in which the object deviates from the focal plane of the lens, blurred images are overlapped and the MFT remarkably deteriorates. In addition, there are cases in which light is incident on a lens other than the right lens (cross talk), and therefore it is necessary to avoid such phenomena as much as possible.

Figure 3:
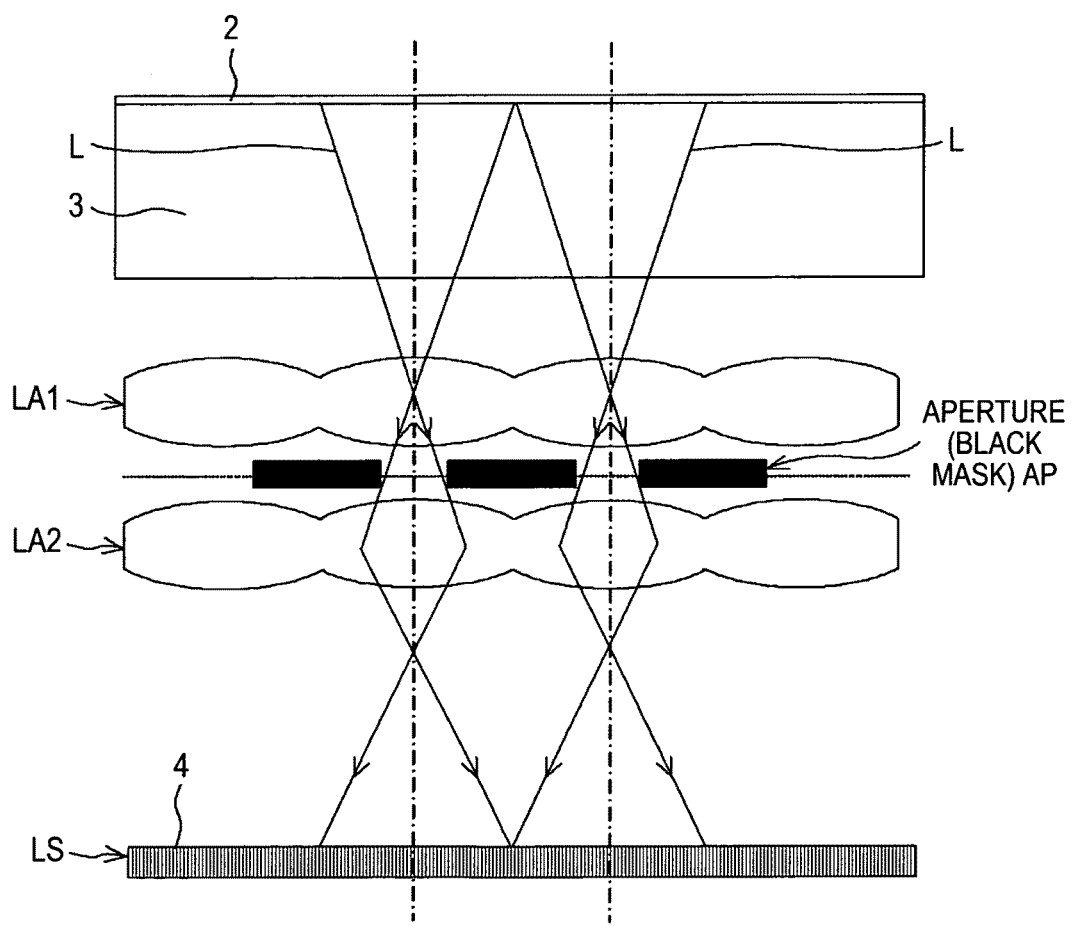
FIG. 3 is a view explaining the principle of the prevention of overlapped images in a case in which an aperture is provided.

As shown in FIG. 1, in order to form an erected image of an image on the object 2 on the sensor LS, two-step lens arrays are used, and the spherical lenses in the lens array LA1 in the first step form inverted images at an intermediate point in the distance with the spherical lenses in the lens array LA2 in the second step, and the lenses in the second step again form erected images, but, in a case in which adjacent pixels are overlapped, as shown in FIG. 3, it is possible to remove blurred images by installing an aperture AP between the first step lenses and the second step lenses. That is, if an aperture AP provided with round openings (light passing holes) OP, sharing the same light axes as the center with the respective lenses, is installed, the aperture AP shields the incidence light from the overlapped portions of adjacent pixels, and therefore it is possible to remove overlapped images on the image plane 4 of the sensor LS and thus to improve the MTF.

Figure 4:
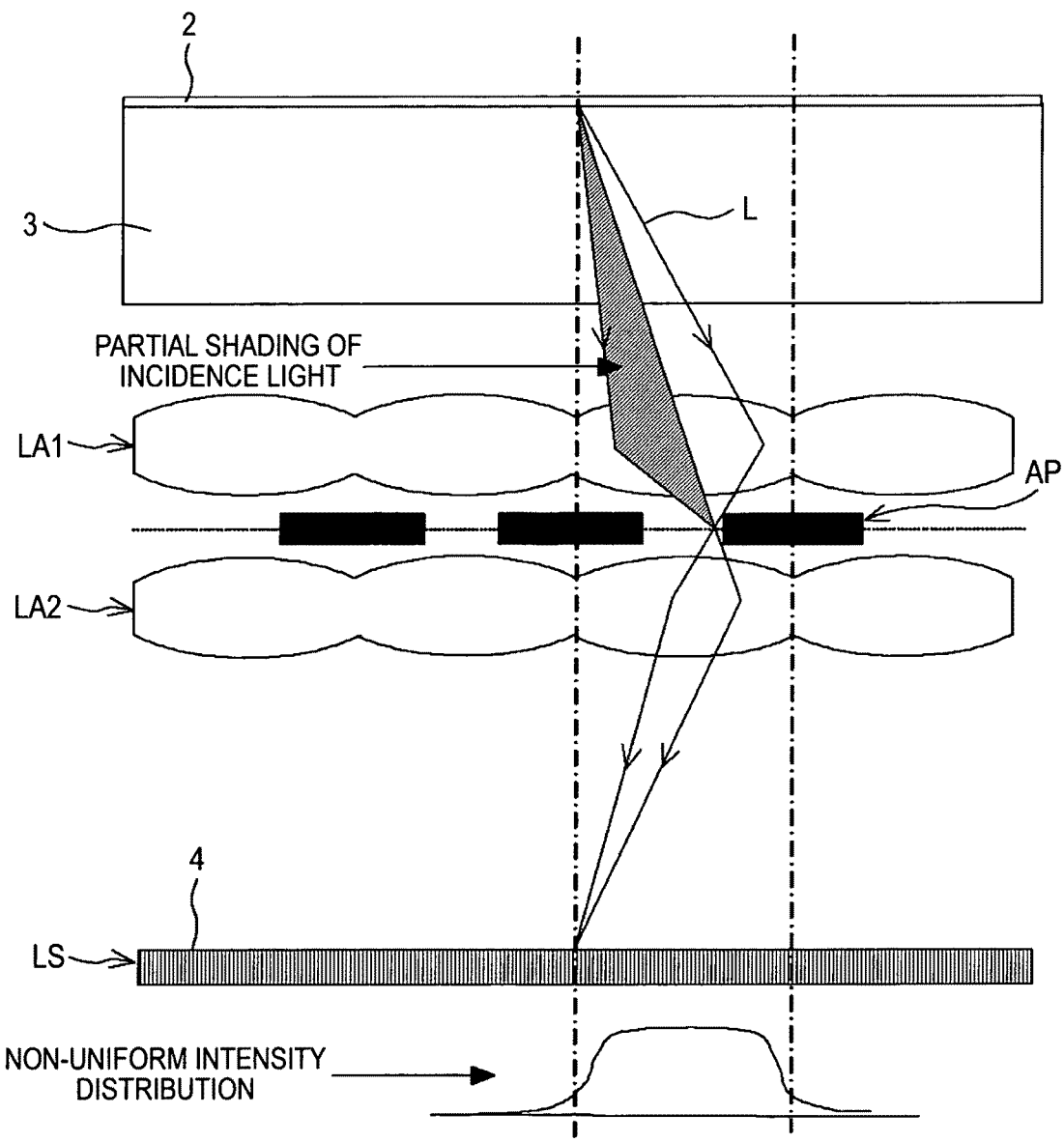
FIG. 4 is a view showing the principle of partial shading of incident light by an aperture.

Meanwhile, FIG. 4 shows a state in which the aperture AP partially shields incidence light (shading), and there are cases in which a decrease in light intensity occurs at the boundary areas of adjacent lenses.

Figure 5:
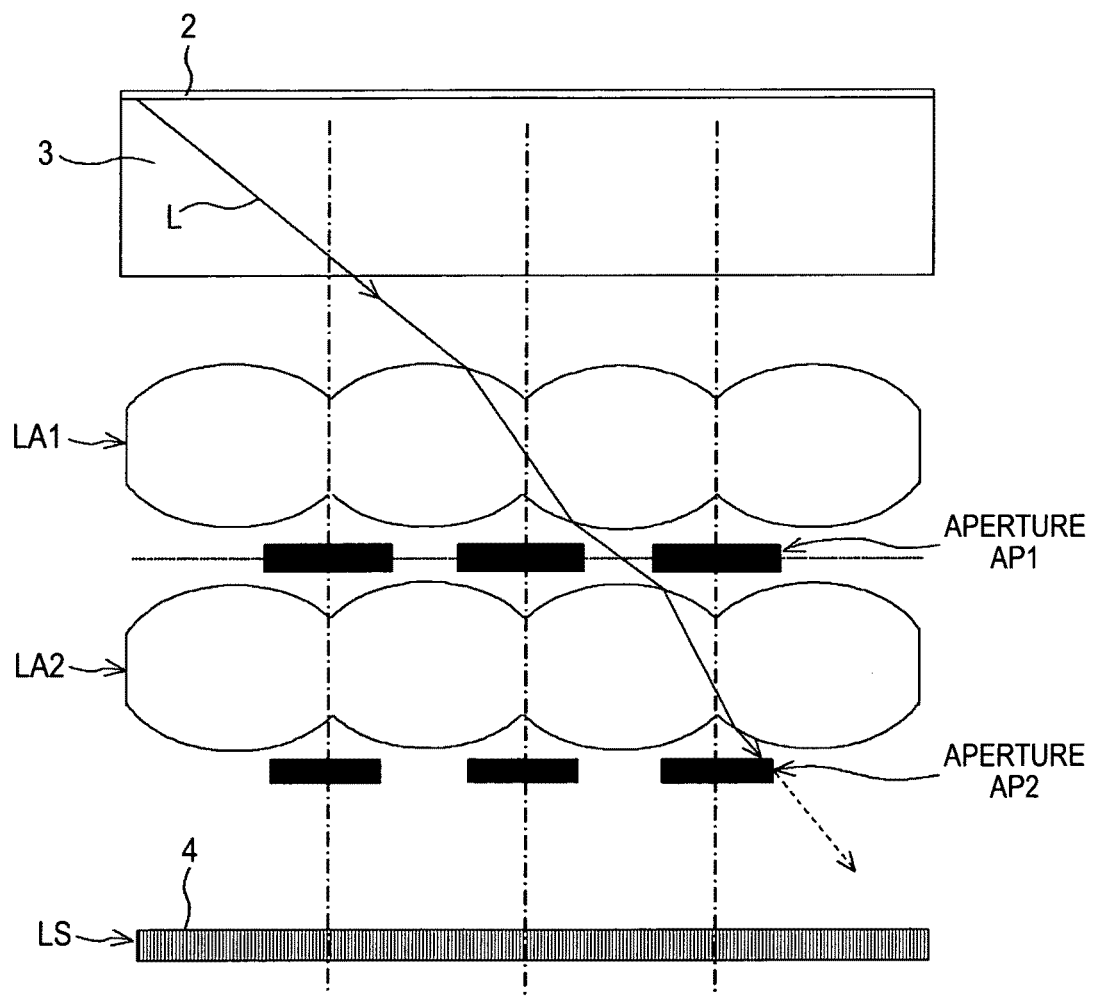
FIG. 5 is a view explaining the principle of the prevention of cross talk by the addition of an aperture.

In addition, with regard to prevention of the above-described cross talk, as shown in FIG. 5, by installing a similar aperture AP1 between the lens arrays LA1 and LA2 and additionally installing a similar aperture AP2 at the light reflection side of the lens array LA2, it is possible to prevent the reflected light L which has passed through the openings in the aperture 2 from being incident on other adjacent image segments by the aperture AP2.

Figure 6:
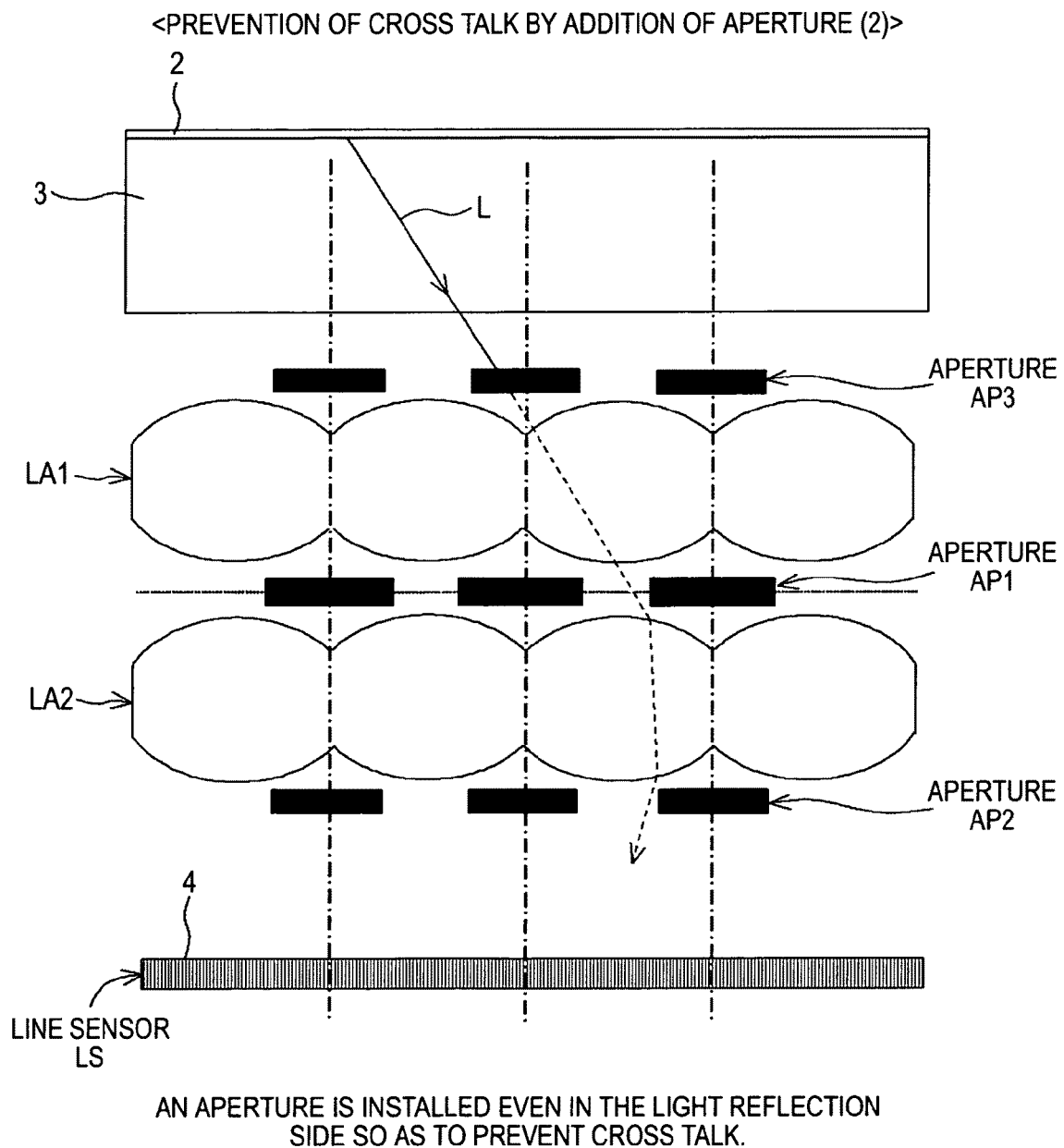
FIG. 6 is a view explaining the principle of the improved prevention of cross talk by the addition of another aperture.
Figure 7:
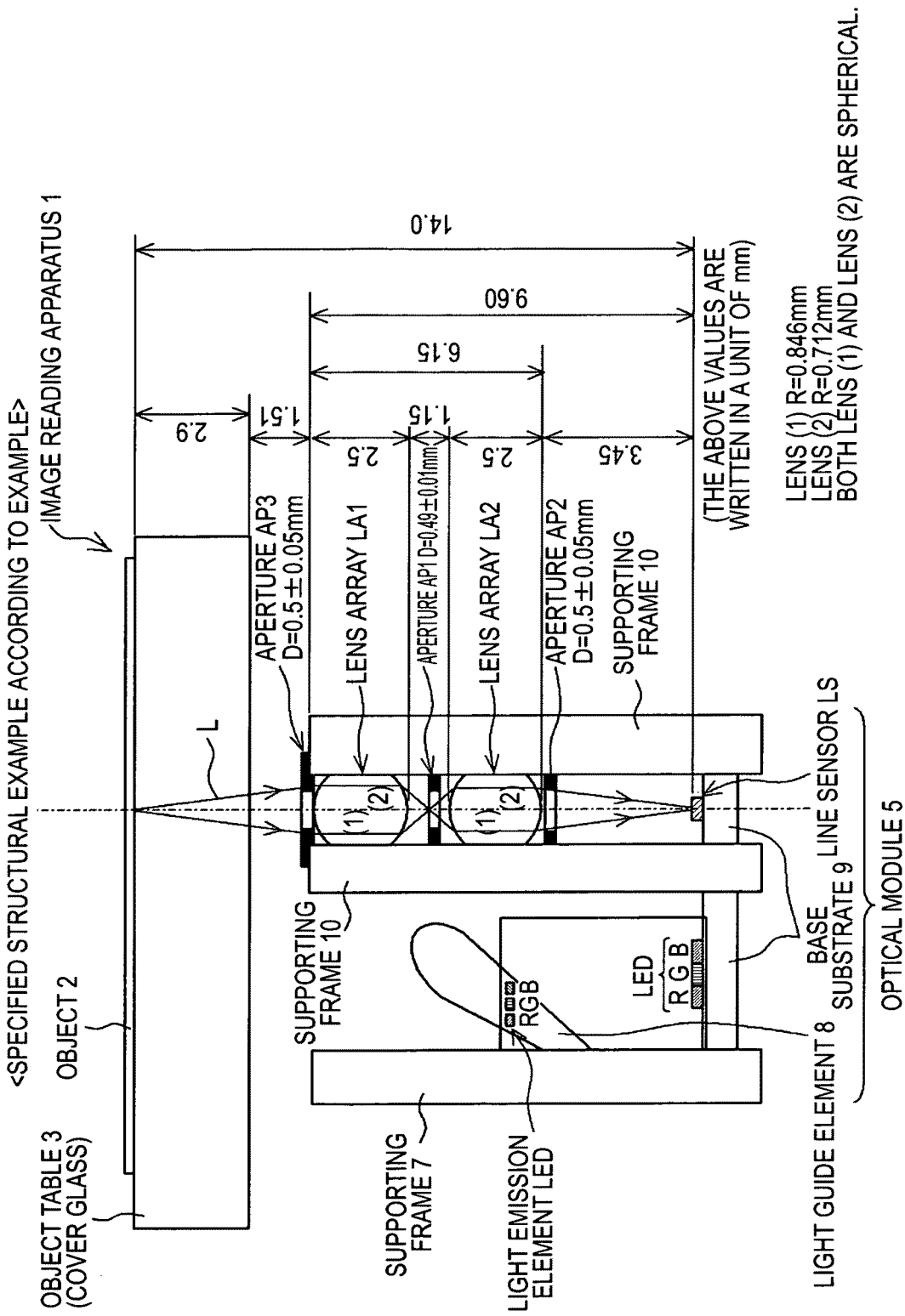
FIG. 7 is a cross-sectional view schematically showing the main parts of the image reading apparatus according to an embodiment of the invention.
Figure 8:
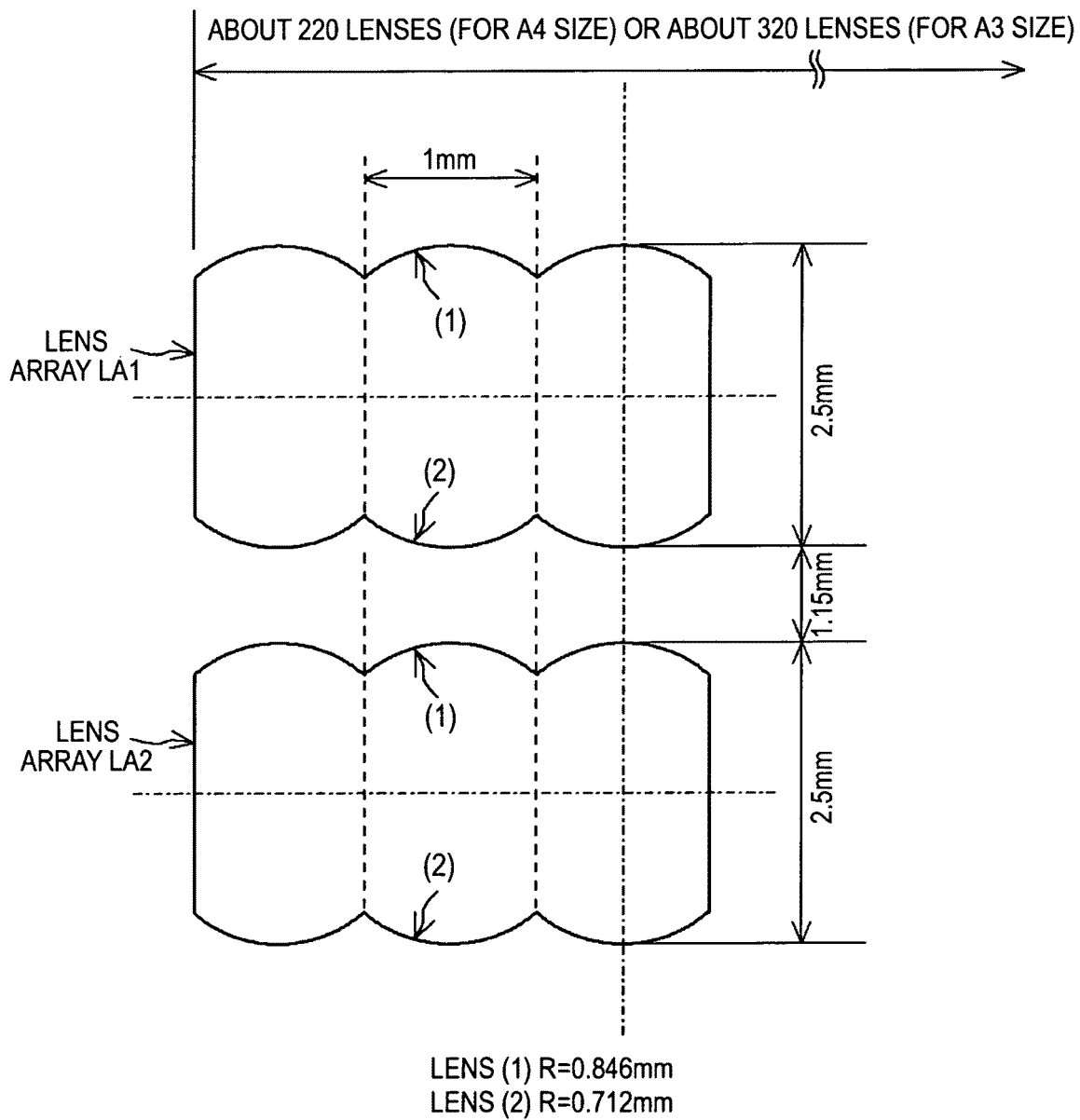
FIG. 8 is a front view of a part of the lens array in the same case.
Figure 9:
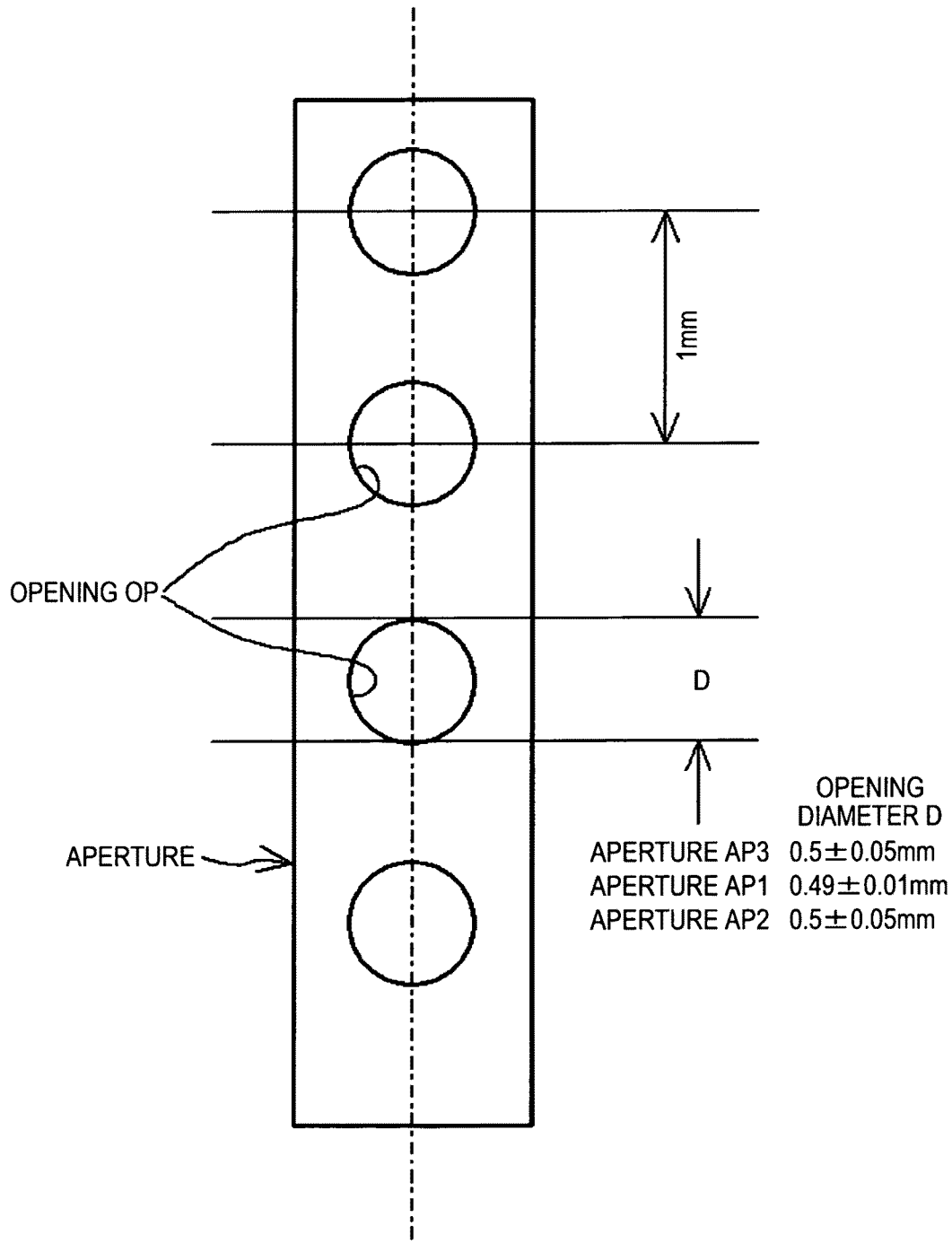
FIG. 9 is a plane view of a part of the aperture in the same case.

Additionally, as shown in FIG. 6, if a similar aperture AP3 is further added at the light incidence side of the lens array LA1, it is possible to shield the reflected light L as shown by the dashed line, which is also advantageous for prevention of cross talk. However, it is not absolutely necessary to provide the third aperture AP3.

According to the image reading apparatus 1 and the optical, module 5 according to the embodiment, since the plurality of lens arrays LA1 and LA2 as the image forming unit for forming erected images of unity magnification have a mutually identical shape and an identical property and are formed by integral molding of a plurality of lenses, it is possible to form the lens arrays using a common metal mold and to easily design and manufacture each lens array with high accuracy at a low cost.

That is, since, instead of a SELFOC lens having the above-described disadvantages, a plurality of, for example, plastic lens arrays (LA1 and LA2) are used, which can be manufactured by injection molding using a metal mold and have an identical shape and property (or material), the injection molding method replaces the complicated process of a SELFOC lens and reduces the production costs, and, at the same time, the lens arrays LA1 and LA2 with the same design contents demands only one metal mold, which further reduces the production costs and shortens a necessary time for the manufacturing of a metal mold since metal mold adjustment or the like is necessary to be performed only on one metal mold.

In addition, since it is possible to prevent images from being overlapped between adjacent lenses, at least, by interposing an aperture AP between the plurality of lens arrays LA1 and LA2, it is possible to suppress degradation in the resolution even when a gap caused by an object occurs and, ultimately, to enlarge the depth of focus. Additionally, since the aperture AP just needs to be inserted at least between the lens arrays LA1 and LA2, the structure becomes simple, which contributes to the simplification and cost reduction of the design and manufacture of the apparatus.

FIGS. 6 to 9 show the structure of an image reading apparatus 1 as a specified example of an embodiment according to the invention.

In the specified example, light emitted from light emission diodes LEDs (red (R), green (G) and blue (B)), which is a light source, is irradiated in a linear shape from a light guide body 8 mounted on a supporting frame 7 on the object plane 2. The supporting frame 7 is fixed to a base substrate 9, but the light emission diode LEDs may be mounted on the base substrate 9 so that the emitted light is guided to the light guide body 8 (the structure of light guidance is not shown).

In addition, the lens arrays LA1 and LA2 are fixed to the supporting frame 10 fixed to the base substrate 9 and the apertures AP1, AP2 and AP3 are also fixed to the supporting frame 10. The lens arrays and apertures are adhesively fixed to the supporting frame 10 with, for example, a cyanoacrylate-based adhesive.

Furthermore, the line sensor LS is fixed to the base substrate 9 just below the lens arrays.

In such a structural example, the details including the dimensions of the respective portions are as follows.

<Light Source>

An LED emitting each of red (R), green (G) and blue (B) with dominant wavelengths and luminosities of 622 nm and from 200 mcd to 300 mcd for red, 530 nm and from 550 mcd to 650 mcd for green, and 465 nm and from 130 mcd to 200 mcd for blue. The light guide body is made of an acrylic resin and has a similar structure to those which are generally used for CIS modules.

<Cover Glass>

Thickness of the cover glass 3: 2.9 mm (soda-lime glass), the inter-surface distance between the bottom surface of the cover glass 3 and the lens surface of the lens array LA1 in the light incidence side in a case in which the focal point is matched on the top surface of the cover glass 3: 1.51 mm <Lens Array>

Radius R of the spherical lenses (1) in the lens arrays LA1 and LA2 in the light incidence side: 0.864 mm, Radius R of the spherical lenses (2) in the lens arrays LA1 and LA2 in the light reflection side: 0.712 mm, Length (height) of the lens arrays LA1 and LA2: 2.5 mm, Pitch of the lenses in the lens arrays LA1 and LA2: 1 mm The respective lens arrays LA1 and LA2 are injection-molded in the same shape with the same material using the same metal mold. A lens resin is an acrylic resin (a lens material includes from 20% to 30% of glass fiber; a carbonate resin or the like may be used). Distance between the lens arrays LA1 and LA2 (peak to peak distance): 1.15 mm. Allowable deviation range of the lens center between the lens arrays LA1 and LA2: 0.05 mm. Number of lenses: about 220 lenses in the case of A4 size and about 320 lenses in the case of A3 size.

Here, since it is intended to consider lenses that replace a low-priced SELFOC lens, it is necessary that materials and manufacturing methods should be considered and lenses should be accompanied by no difficulty in the process of lens manufacturing, have a curvature that can be processed with accuracy, and as a product be necessary to be within defined small dimensions. The lens pitch is set to 1 mm in consideration of the above factors, but the lens pitch may arbitrarily be varied and be about several mm.

<Aperture>

Opening diameter D in the apertures AP3 in the light incidence side and the aperture AP2 in the light reflection side: 0.5±0.05 mm, Disposition of the apertures AP3 in the light incidence side and the aperture AP2 in the light reflection side: in the middle between just above the lens array LA1 and just below the lens array LA2 (in the middle of the lens arrays LA1 to LA2), Opening diameter D in the aperture AP1: 0.49±0.01 mm, Material and thickness of the apertures AP1, AP2 and AP3: black polyethylene terephthalate (PET) film, from 100 μm to 250 μm in thickness.

<Line Sensor>

Line sensor LS: CCD linear sensor (600 dpi) (or CMOS linear image sensor), Distance between the peak of the lens array LA2 in the light reflection side and the line sensor LS: 3.45 mm.

The structural example of the embodiment is based on a finding that it is possible to easily perform the control of different pixel OS (object segment) areas or the control of boundaries between adjacent lenses by displacing the focal plane from the cover glass surface.

FIG. 10 shows a measurement result of MTF (values of six black and white diagonal patterns per 1 mm) in a case in which the heights of object planes are varied with a resolution of 600 dpi in the structural example of the embodiment.

In FIG. 10, the horizontal axis indicates variation in object positions from the focal plane in a lens system ("gap" amount Z), and the vertical axis indicates values of MTF with 600 dpi {=(Imax−Imin)/(Imax+Imin) %}. In addition, the origin on the horizontal axis represents a case in which the focal plane matches an object plane, and the negative axis direction represents an object disposed closer to the lens array side than the focal plane, and the positive axis direction represent an object disposed farther from the lens array than the focal plane.

From the measurement result, in the optical system according to the embodiment, it was found that the MTF can be maintained to be high and high definition can be obtained in a wide range of the "gap" amount Z of an object from the focal plane. However, if the gap amount is smaller than −0.7 mm on the negative axis, the diagonal pattern on the object is constricted, and, if the gap amount is larger than 0.2 mm on the positive axis, hot (or dark) lines are generated in the diagonal pattern on the object and thus the diagonal pattern is broken; therefore it is desirable to set the gap amount from −0.7 mm to 0.2 mm.

As such, since the widened allowable range of the gap amount, in which high definition can be obtained with a high MTF value, can significantly enlarge the depth of focus, compared to an optical system in the related art using a SELFOC lens with an allowable range indicated by a dashed line, it is possible to obtain high resolution even when an ADF is used, and therefore maintenance and management of optical systems also become easier. Particularly, it was found that setting the focal plane of a lens system to a higher position than the surface of a cover glass (in a case in which an object plane is positioned substantially below the focal plane) produces superior definition.

That is, in a case in which an object plane is positioned from 0.2 mm above the focal plane to 0.7 mm below the focal plane (0.9 mm in terms of the depth of focus), since it is possible to maintain high definition and high MTF, which means, since the depth of focus is more than or equal to 0.5 mm, it is possible to use an ADF or the like and to newly apply to a scanner or the like, and it is not absolutely necessary to precisely control the distance between a cover glass surface and a scanner sensor or between lenses in the production process of scanners, the embodiment contributes to improvement in productivity and yield rate. In addition, compared to the resolution of a SELFOC lens (from 300 dpi to 600 dpi), it is possible to sufficiently meet the intrinsic resolution of a line sensor (more than or equal to 1000 dpi) and thus to achieve a high intrinsic resolution of a line sensor.

In addition, in the system, it was found that overlapping in the inter-lens boundaries between adjacent lenses, which are formed with 1 mm pitch, causes brightness variation and therefore hot lines (bright lines) or dark lines (dark lines) are generated.

Particularly, it is sensitive to the opening diameter of the intermediate aperture AP1, and therefore, as shown in FIG. 11, if the opening diameter is larger than 0.55 mmφ and the design value (0.49 mmφ), hot lines are generated in boundary areas of adjacent lenses. Inversely to the above, if the opening diameter of the intermediate aperture AP1 is smaller than 0.45 mmφ and the design value, dark lines are generated.

In order to avoid such a phenomenon, it is necessary to improve controllability by setting the opening diameter of the intermediate aperture AP1 to 0.49 (the design value)±0.01 mm. FIGS. 12 to 16 show examples of ray tracing simulation in the present optical system in a case in which such an improvement is made.

Figure 12:
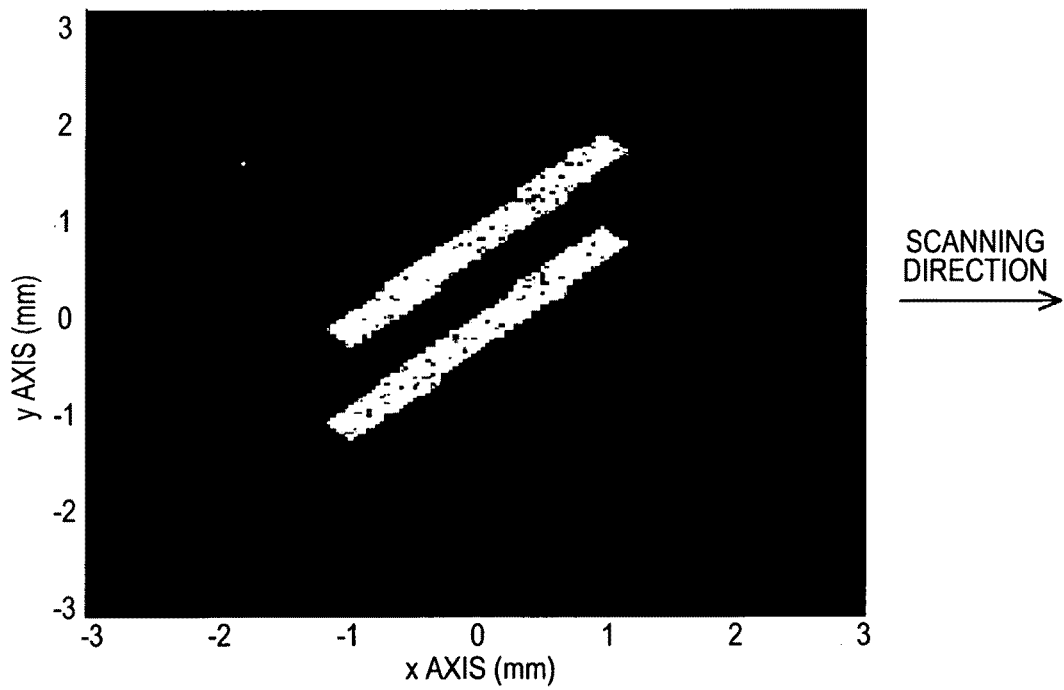
FIG. 12 is a view of ray tracing simulation when the diameter of the intermediate aperture opening is appropriate in the same case.

In the countermeasure example (1) shown in FIG. 12, since it is possible to control overlapping of images in lens boundaries by setting the opening diameter of the intermediate aperture to the design value, hot lines (or dark lines) are removed, and almost uniform light intensity is obtained.

The countermeasure example (2) shown in FIG. 13 is a case of the conditions shown in FIG. 12 with a varied black level brightness of 25%, in which bright variation along the line L1 (above the lens edge) and the line L2 (above the lens center) in a direction perpendicular to the scanning direction is markedly removed.

In the countermeasure example (3) shown in FIG. 14, almost all brightness variation is removed by setting the "gap" amount Z of an object to −0.5 mm and positioning the object plane 0.5 mm below the focal plane in the same black level brightness as the above.

The countermeasure example (4) shown in FIG. 15 is a case of the conditions shown in FIG. 12 with a varied black level brightness of 50%, in which brightness variation is remarkably removed.

In the countermeasure example (5) shown in FIG. 16, almost all brightness variation is removed by setting the "gap" amount Z of an object to −0.5 mm in the same black level brightness as the above.

Thus far, the embodiment and examples of the invention have been described, but the invention is not limited to the above embodiment and examples, and thus a variety of variations may be made.

For example, beginning from the shapes of the components of the apparatus, dimensions, materials, types or the like may be varied in diverse manners, and also the scanning method of light may be an object table moving type and may not be a light reflection type.

With the embodiment of the invention, it is possible to provide an image scanner, a copy machine or the like that enlarges the depth of focus of lens arrays, suppresses degradation in the resolution with respect to a "gap" caused by a subject (object), and is easily designed and manufactured with high accuracy at a low cost.

The present application contains subject matter related to that disclosed in Japanese Priority Patent Application JP 2010-088535 filed in the Japan Patent Office on Apr. 7, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image reading apparatus comprising:
a light irradiating means for irradiating light to a subject having images to be read;
an image forming means for making the light from the subject incident on an image plane so as to form images as erected images; and
a photoelectric conversion means for converting the incident light of the erected images into image signals,
wherein the image forming means is constituted of a plurality of lens arrays that have a mutually identical shape and property and are sequentially disposed, sharing common light axes, between the subject and the photoelectric conversion means, and the respective lens arrays are formed by integral molding of a plurality of lenses, and an aperture provided with light passing holes with the light axes as the center is interposed at least between the plurality of lens arrays, and areas other than the light passing holes in the aperture form light shielding areas.

2. The image reading apparatus according to claim 1,
wherein the aperture is disposed, among the intermediate position, the light incidence side and the light reflection side of the plurality of lens arrays, at least at the intermediate position.

3. The image reading apparatus according to claim 1,
wherein the subject is disposed at a position closer to the image forming means than the focal plane of the image forming means formed at a side of the subject.

4. The image reading apparatus according to claim 1,
wherein the light irradiating means, the image forming means, the aperture and the photoelectric conversion means are unitized; the light irradiating means irradiates linear light to the subject while the unit moves along with respect to the subject, the linear light reflected from the subject passes through the light passing holes in the aperture, and the plurality of lens arrays form erected images of unity magnification on the image plane.

5. The image reading apparatus according to claim 4,
wherein the light irradiating means is constituted of a light emission element and a light guide body, the image forming means is constituted of a plurality of lens arrays which is formed by integrally molding a plurality of spherical lenses in a line shape by the same metal mold, the aperture is constituted of a light shielding film provided with a plurality of round light passing holes sharing the same center with the plurality of spherical lenses, and, furthermore, the photoelectric conversion means is constituted of a linear image sensor.

6. An optical module for image reading comprising:
a light irradiating means for irradiating light to a subject having images to be read;
an image forming means for making the light from the subject incident on an image plane so as to form images as erected images; and
a photoelectric conversion means for converting the incident light of the erected images into image signals,
the light irradiating means, the image forming means and photoelectric conversion means being unitized,
wherein the image forming means is constituted of a plurality of lens arrays that have a mutually identical shape and property and are sequentially disposed, sharing common light axes, between the subject and the photoelectric conversion means, and the respective lens arrays are formed by integral molding of a plurality of lenses, and an aperture provided with light passing holes with the light axes as the center is interposed at least between the plurality of lens arrays, and areas other than the light passing holes in the aperture form light shielding areas.

7. The optical module according to claim 6,
wherein the aperture is disposed, among the intermediate position, light incidence side and light reflection side of the plurality of lens arrays, at least at the intermediate position.

8. The optical module according to claim 6,
wherein the subject is disposed at a position closer to the image forming means than the focal plane of the image forming means formed at a side of the subject.

9. The optical module according to claim 6,
wherein the light irradiating means irradiates light to the subject in a line shape while the unit of the light irradiating means, the image forming means, the aperture and the photoelectric conversion means moves along with respect to the subject, the linear light reflected from the subject passes through the light passing holes in the aperture, and the plurality of lens arrays form erected images of unity magnification on the image plane.

10. The optical module according to claim 9,
wherein the light irradiating means is constituted of a light emission element and a light guide body, the image forming means is constituted of a plurality of lens arrays which is formed by integrally molding a plurality of spherical lenses in a line shape by the same metal mold, the aperture is constituted of a light shielding film provided with a plurality of round light passing holes sharing the same center with the plurality of spherical lenses, and, furthermore, the photoelectric conversion means is constituted of a linear image sensor.

11. An image reading apparatus comprising:
a light irradiating unit configured to irradiate light to a subject having images to be read;
an image forming unit configured to make the light from the subject incident on an image plane so as to form images as erected images; and
a photoelectric conversion unit configured to convert the incident light of the erected images into image signals,
wherein the image forming unit is constituted of a plurality of lens arrays that have a mutually identical shape and property and are sequentially disposed, sharing common light axes, between the subject and the photoelectric conversion unit, and the respective lens arrays are formed by integral molding of a plurality of lenses, and an aperture provided with light passing holes with the light axes as the center is interposed at least between the plurality of lens arrays, and areas other than the light passing holes in the aperture form light shielding areas.

12. An optical module for image reading comprising:
a light irradiating unit configured to irradiate light to a subject having images to be read;
an image forming unit configured to make the light from the subject incident on an image plane so as to form images as erected images; and
a photoelectric conversion unit configured to convert the incident light of the erected images into image signals,
the light irradiating unit, the image forming unit and photoelectric conversion unit being unitized,
wherein the image forming unit is constituted of a plurality of lens arrays that have a mutually identical shape and property and are sequentially disposed, sharing common light axes, between the subject and the photoelectric conversion unit, and the respective lens arrays are formed by integral molding of a plurality of lenses,
and an aperture provided with light passing holes with the light axes as the center is interposed at least between the plurality of lens arrays, and areas other than the light passing holes in the aperture form light shielding areas.

* * * * *